United States Patent
Xian et al.

(10) Patent No.: US 10,846,293 B1
(45) Date of Patent: Nov. 24, 2020

(54) FACTUAL QUERY PATTERN LEARNING

(71) Applicant: Google LLC, Mountain View, CA (US)

(72) Inventors: Junli Xian, Jersey City, NJ (US); Engin Cinar Sahin, New York, NY (US); John Blitzer, Mountain View, CA (US); Emma S. Persky, New York, NY (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 15/872,296

(22) Filed: Jan. 16, 2018

Related U.S. Application Data

(63) Continuation of application No. 14/710,794, filed on May 13, 2015, now Pat. No. 9,898,512, which is a continuation of application No. 13/841,759, filed on Mar. 15, 2013, now Pat. No. 9,037,568.

(51) Int. Cl.
*G06F 16/2457* (2019.01)
*G06F 16/14* (2019.01)
*G06F 16/9535* (2019.01)

(52) U.S. Cl.
CPC ........ *G06F 16/24578* (2019.01); *G06F 16/14* (2019.01); *G06F 16/9535* (2019.01)

(58) Field of Classification Search
CPC . G06F 16/24578; G06F 16/14; G06F 16/9535
USPC ........................................................ 707/727
See application file for complete search history.

(56) References Cited

U.S. PATENT DOCUMENTS

| | | | |
|---|---|---|---|
| 5,706,497 A | 1/1998 | Takahashi et al. | |
| 5,752,242 A | 5/1998 | Havens | |
| 5,778,364 A | 7/1998 | Nelson | |
| 5,794,227 A | 8/1998 | Brown | |
| 5,963,934 A | 10/1999 | Cochrane | |
| 5,983,216 A | 11/1999 | Kirsch et al. | |
| 5,987,455 A | 11/1999 | Cochrane et al. | |
| 6,584,464 B1 | 6/2003 | Warthen | |
| 6,829,603 B1 | 12/2004 | Chai et al. | |
| 8,200,617 B2 * | 6/2012 | Spivack | G06F 40/186 707/602 |
| 8,515,986 B2 * | 8/2013 | Salvetti | G06F 16/3329 707/768 |
| 8,838,512 B2 | 9/2014 | Yan et al. | |
| 9,015,031 B2 * | 4/2015 | Ferrucci | G06F 16/90332 704/7 |

(Continued)

OTHER PUBLICATIONS

Song, Yang, et al., "Query Suggestion by Constructing Term-Transition Graphs", WSDM '12, Seattle, WA, Feb. 8-12, 2012, pp. 353-362.*

(Continued)

*Primary Examiner* — Robert Stevens

(74) *Attorney, Agent, or Firm* — Fish & Richardson P.C.

(57) ABSTRACT

Methods, systems, and apparatus, including computer programs encoded on a computer storage medium, for providing a statement that references a particular attribute of a particular topic, in response to providing the statement, obtaining one or more query patterns that each include one or more query terms that are used in queries submitted to a search system in obtaining a value for the particular attribute of the particular topic, generalizing one or more of the query patterns, and associating the one or more generalized query patterns with one or more other topics that include the particular attribute.

15 Claims, 3 Drawing Sheets

(56) References Cited

U.S. PATENT DOCUMENTS

| | | | |
|---|---|---|---|
| 9,367,608 B1* | 6/2016 | Zhang | G06F 16/35 |
| 2004/0117352 A1 | 6/2004 | Schabes et al. | |
| 2004/0243545 A1 | 12/2004 | Boone et al. | |
| 2005/0055321 A1 | 3/2005 | Fratkina | |
| 2006/0136298 A1 | 6/2006 | Klein | |
| 2007/0185859 A1* | 8/2007 | Flowers | G06F 16/3344 |
| 2010/0138402 A1 | 6/2010 | Burroughs et al. | |
| 2010/0268700 A1* | 10/2010 | Wissner | G06F 17/241 |
| | | | 707/706 |
| 2010/0332499 A1 | 12/2010 | Pan | |
| 2011/0060733 A1 | 3/2011 | Peng | |
| 2012/0143895 A1* | 6/2012 | Salvetti | G06F 16/3329 |
| | | | 707/769 |
| 2012/0265760 A1 | 10/2012 | Yan et al. | |
| 2012/0265787 A1 | 10/2012 | Hsu et al. | |
| 2013/0091119 A1 | 4/2013 | Huang | |
| 2013/0173650 A1 | 7/2013 | Marantz | |
| 2013/0185330 A1 | 7/2013 | Li | |
| 2014/0075004 A1 | 3/2014 | Van Dusen et al. | |

OTHER PUBLICATIONS

Wang, Xuanhui, et al., "Mining Term Association Patterns from Search Logs for Effective Query Reformulation", CIKM '08, Napa Valley, CA, Oct. 26-30, 2008, pp. 479-288.*

Stefanova, Silvia, et al., "SPARQL queries to RDFS views of Topic Maps", Int. J. Metadata, Semantics and Ontologies, vol. 5, No. 1 , © 2010 Inderscience Enterprise, Ltd., pp. 1-16.*

Kelleher, Justin, "A Reusable Traceability Framework using Patterns", TEFSE 2005, Long Beach, CA, Nov. 8, 2005, pp. 50-55.*

Deutsch, Alin, et al., "Storing Semistructured Data with STORED", SIGMOD '99, Philadelphia, PA, © 1999 ACM, pp. 431-442.*

Agarwal, Ganesh, et al., Towards Rich Query Interpretation: Walking Back and Forth for Mining Query Templates, WWW 2010, Raleigh, NC, Apr. 26-30, 2010, pp. 1-10.

Alonso and Lease, "Crowdsourcing for information retrieval: principles, methods, and applications" In Proceedings of the 34th international ACM SIGIR conference on Research and development in Information Retrieval (SIGIR '11). ACM, New York, NY, USA, 2011, 1 page.

Arguello et al., "Sources of evidence for vertical selection," In Proceedings of the 32nd international ACM SIGIR conference on Research and development in information retrieval (SIGIR '09). ACM, New York, NY, USA, pp. 315-322, 2009.

Arguello, Jaime, et al., "A Methodology for Evaluating Aggregated Search Results", ECIR 2011, LNCS 661, Springer-Verlag, Berlin, Germany,© 2011, pp. 141-152.

Arguello, Jaime, et al., "Classification-Based Resource Selection", CIKM '09, Hong Kong, China, Nov. 2-6, 2009, pp. 1277-1286.

Arguello, Jaime, et al., "Learning to Aggregate Vertical Results into Web Search Results", CIKM '11, Glasgow, Scotland, Oct. 24-28, 2011, pp. 201-210.

Bernstein et al., "Direct answers for search queries in the long tail," In Proceedings of the SIGCHI Conference on Human Factors in Computing Systems (CHI '12). ACM, New York, NY, USA, pp.237-246, 2012.

Cafarella et al., "WebTables: exploring the power of tables on the web," Proc. VLDB Endow. 1,(1):538-549, Aug. 2008.

Demartini et al., "CrowdQ: Crowdsourced Query Understanding," The Conference on Innovative Data Systems Research (CIDR) [online] Nov. 2012 [retrieved on Jun. 18, 2014]. Retrieved from the Internet: <URL: http://www.cidrdb.org/cidr2013/Papers/CIDR13_Paper137.pdf>, 4 pages.

Diaz, Fernando, et al., "Adaptation of Offline Vertical Selection Predictions in the Presence of User Feedback", SIGIR '09, Boston, MA, Jul. 19-23, 2009, pp. 323-330.

Franklin et al., "CrowdDB: answering queries with crowdsourcing," In Proceedings of the 2011 ACM SIGMOD International Conference on Management of data (SIGMOD '11). ACM, New York, NY, USA, pp. 61-72, 2011.

Kim, Hae-Jung, et al., "Semantic Query Expansion Based on a Question Category Concept List", ICADL 2004, LNCS 3334, Springer-Verlag, Berlin, Germany, 0 2004, pp. 501-509.

Marcus et al., "Crowdsourced Databases: Query Processing with People," Proceedings of the 5th Biennial Conference on Innovative Data Systems Research, pp. 211-214. CIDR, Jan. 2011.

Melnik, Sergey, et al., "Compiling Mappings to Bridge Applications and Databases", ACM Transactions on Database Systems, vol. 33, No. 4, Article 22, Nov. 2008, 50 pages.

Owei, Vesper, et al., "Natural Language Query Filtration in the Conceptual Query Language", HICSS 1997, Wailea, HI, Jan. 7-10, 1997, pp. 539-549.

Szpektor, ldon, et al., "Improving Recommendation for Long-tail Queries via Templates", WWW 2011—Session: Recommendation, Hyderabad, India, Mar. 28-Apr. 1, 2011, pp. 47-56.

Unger et al., "Template-based question answering over RDF data," In Proceedings of the 21st international conference on World Wide Web (WWW '12). pp. 639-648, Apr. 16-20, 2012.

Walter, Sebastian, et al., "Evaluation of a Layered Approach to Question Answering over Linked Data", ISWC 2012, Part II, LNCS 7650, Springer-Verlag, Berlin, Germany,© 2012, pp. 362-374.

White et al., "Studying the use of popular destinations to enhance web search interaction," In Proceedings of the 30th annual international ACM SIGIR conference on Research and development in information retrieval (SIGIR '07). ACM, New York, NY, USA, pp. 159-166, 2007.

Yahya et al., "Natural language questions for the web of data," In Proceedings of the 2012 Joint Conference on Empirical Methods in Natural Language Processing and Computational Natural Language Learning (EMNLP-CoNLL '12). Association for Computational Linguistics, Stroudsburg, PA, USA, pp. 379-390, 2012.

Yahya, Anwar Ali, et al., "Automatic Classification of Questions into Bloom's Cognitive Levels Using Support Vector Machines", The International Arab Conference on Information Technology, Naif Arab University for Security Science, Riyadh, Saudi Arabia, © 2011, pp. 1-6.

Yahya, Mohamed, et al., "Deep Answers for Naturally Asked Questions on the Web of Data", WWW 2012—Demos Track, Lyon, France, Apr. 16-20, 2012, pp. 445-448.

Office Action issued in U.S. Appl. No. 14/710,794, dated Nov. 4, 2016, 12 pages.

Office Action issued in U.S. Appl. No. 14/710,794, dated Apr. 19, 2017, 14 pages.

Notice of Allowance issued in U.S. Appl. No. 14/710,794, dated Oct. 20, 2017, 8 pages.

* cited by examiner

FACTUAL QUERY PATTERN LEARNING

CROSS REFERENCE TO RELATED APPLICATIONS

This application is a continuation of U.S. application Ser. No. 14/710,794, filed May 13, 2015, which is a continuation of U.S. application Ser. No. 13/841,759, filed Mar. 15, 2013, the contents of which are incorporated by reference.

TECHNICAL FIELD

This document generally relates to managing associations of information contained in a collection of documents.

BACKGROUND

Many users use the Internet to obtain information. For example, users may submit textual queries about a topic for which they wish information. In some situations, these queries can be submitted to a search system that is configured to search a collection of documents to obtain information pertaining to the textual queries. In some implementations, the queries can be a collection of words that are submitted to the search system using Boolean operators (e.g., OR and AND) to perform the search.

SUMMARY

In general, one innovative aspect of the subject matter described in this specification can be embodied in methods that include crowdsourcing the generation of one or more textual query patterns relating to one or more facts about a particular person, place, or thing. For instance, users of an Internet-based system can receive a statement that states a fact about a particular thing, such as "Barack Obama is 6'1"." In response, the users of the Internet-based system can generate and send one or more queries that could be used to retrieve the fact, such as the question "How tall is Barack Obama?" or a query that includes the query terms "Barack Obama height."

The queries can be rated by other users of the Internet-based system to remove queries that include poor grammar, use awkward sentence structure, are not directed to the fact provided in the statement, or are otherwise less useful than other queries at soliciting the particular fact. The remaining queries can be normalized into query patterns, e.g., by removing punctuation from each query, correcting misspellings, converting the query terms in each query to a lower-case representation, removing so-called "stop-words" from each query, and using other normalization techniques.

The query patterns can be generalized into generalized query patterns that can be associated with one or more facts stored by a search system. These associations can be used at some later time when a user submits a query that solicits a fact from the search system. For example, the query "How tall is Barack Obama?" can be stored as the query pattern [how tall is barack obama], which can be generalized into the generalized query pattern [how tall is/Person/] and associated with each height value for each person that is stored by the search system. Then, when the search system receives the query "How tall is Abraham Lincoln?" the search system can obtain the answer by matching the terms of the query to the generalized query pattern. For example, the query terms can be normalized to [how tall is abraham lincoln] and matched to a generalized query pattern [how tall is/Person/].

In a first aspect, a computer-implemented method includes providing a statement that references a particular attribute of a particular topic, in response to providing the statement, obtaining one or more query patterns that each include one or more query terms that are used in queries submitted to a search system in obtaining a value for the particular attribute of the particular topic, generalizing one or more of the query patterns, and associating the one or more generalized query patterns with one or more other topics that include the particular attribute.

Implementations can include an, all, or none of the following features. The method can also include receiving a query from a user, determining that the query includes a first portion that matches a particular, generalized query pattern, and based on determining that the query includes the first portion that matches the particular, generalized query pattern, retrieving a value of the particular attribute of another topic referenced by the query. Obtaining one or more query patterns can include receiving queries relating to the statement and normalizing the received queries. Obtaining one or more query patterns can also include filtering the received queries to remove queries that occur with a frequency that does not satisfy a predetermined threshold. Generalizing one or more of the query patterns can include replacing a first portion of each of the one or more query patterns that match the particular topic with one or more identifiers. The statement can be selected to cause one or more query patterns to be obtained that include the particular attribute for which associations for the one or more generalized query patterns that include the particular attribute are needed. The statement can be provided to a plurality of human users.

In a second aspect, computer-implemented method includes providing a statement that references a particular attribute of a particular topic, in response to providing the statement, obtaining one or more query patterns that each include one or more query terms that are used in queries submitted to a search system in obtaining a value for the particular attribute of the particular topic, generalizing one or more of the query patterns, and associating the one or more generalized query patterns with one or more other attributes that are included by the particular topic.

Implementations can include any, all, or none of the following features. Method can also include receiving a query from a user, determining that the query includes a first portion that matches a particular, generalized query pattern, and based on determining that the query includes the first portion that matches the particular, generalized query pattern, retrieving one or more other values of one or more other attributes of the particular topic referenced by the query. Obtaining one or more query patterns can include receiving queries relating to the statement and normalizing the received queries. Obtaining the one more query patterns can also include filtering the received queries to remove queries that occur with a frequency that does not satisfy a predetermined threshold. Generalizing one or more of the query patterns can include replacing a first portion of each of the one or more query patterns that match the particular attribute with one or more identifiers.

In a third aspect, a system includes one or more processors, an interface that is configured to i) provide a statement that references a particular attribute of a particular topic and ii) in response to providing the statement, obtain one or more query patterns, the query patterns including one or more query terms that are used in queries submitted to a search system in obtaining a value for the particular attribute of the particular topic, a query pattern processor that is configured to generalize the one or more received query patterns and to associate the one or more generalized query patterns with one or more other topics that include the particular attribute, and the search system that is configured to obtain the value for the particular attribute of the particular topic in response to the submitted question.

Implementations can include any, all, or none of the following features. The search system can also be configured to receive a query from a user, determine that the query includes a first portion that matches a particular, generalized query pattern, and based on determining that the query includes the first portion that matches the particular, generalized query pattern, retrieving a value of the particular attribute of another topic referenced by the query. Obtaining one or more query patterns can include receiving one or more queries and normalizing the received queries. The interface can also be configured to filter the received queries to remove queries that occur with a frequency that does satisfy a predetermined threshold. The query pattern processor can also be configured to replacing a first portion of each of the one or more query patterns that match the particular topic with one or more identifiers. The statement can be selected to cause one or more query patterns to be obtained by the interface that include the particular attribute for which associations for the one or more generalized query patterns that include the particular attribute are needed. The interface can be configured to provide the statement to a plurality of human users.

In a fourth aspect, one or more machine-readable tangible storage devices stores instructions that, when executed by one or more computer processors, perform operations including providing a statement that references a particular attribute of a particular topic, in response to providing the statement, obtaining one or more query patterns that each include one or more query terms that are used in queries submitted to a search system in obtaining a value for the particular attribute of the particular topic, generalizing one or more of the query patterns, and associating the one or more generalized query patterns with one or more other topics that include the particular attribute.

Particular embodiments of the subject matter described in this specification can be implemented so as to realize one or more of the following advantages. Data and computational efficiencies can be realized because a relatively large number of facts can be identified about a wide range of topics by receiving a relatively small number of query patterns. The query patterns received can be validated or otherwise filtered before being associated with facts or topics, improving the overall accuracy of the facts that can be provided by the system in response to a question.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document is generally directed to systems and techniques for obtaining and delivering to various computing devices, an answer to a query that is submitted to a search system. In some implementations, queries may inquire about facts, e.g., properties, characteristics, or attributes, about a particular topic. For example, the search system may receive a query "How tall is Abraham Lincoln?"

To provide the search system with the capability to answer queries about a topic, the search system may first receive queries about an attribute of a different topic. For example, users may have previously submitted the queries "How tall is Barack Obama?", "What is Barack Obama's height?", or "What is the height of Barack Obama?", in order to determine the height of Barack Obama or, more specifically, to determine the value associated with a "height" attribute of the topic "Barack Obama."

These queries may be filtered and/or normalized using a number of different techniques, and may be stored as query patterns. For example, the queries "How tall is Barack Obama?" or "Barak Obama height" can be stored as query patterns [how tall is barack obama] and [barack obama height], respectively.

The search system may generalize the query patterns, to allow users to obtain information about similar attributes of different topics or different attributes of similar topics. For example, because the topic "Barack Obama" is indicated as being a member of the "president" category, the specific query patterns that refer to Barack Obama's height may be generalized as [how tall is/President/], or [/President/ height].

To obtain information about similar attributes of different topics or different attributes of similar topics, the system can associate the generalized query patterns with one or more topics or one or more attributes. For example, when another user of the search system submits query such as "How tall is Abraham Lincoln?", the search system can determine that the topic "Abraham Lincoln" is also indicated as being a member of the "president" category, and can match this query to the generalized query pattern [how tall is/President/], to determine that the query is a question relating to the height of Abraham Lincoln. The search system may thereafter return the value associated with the "height" attribute for the topic "Abraham Lincoln."

Figure 1:
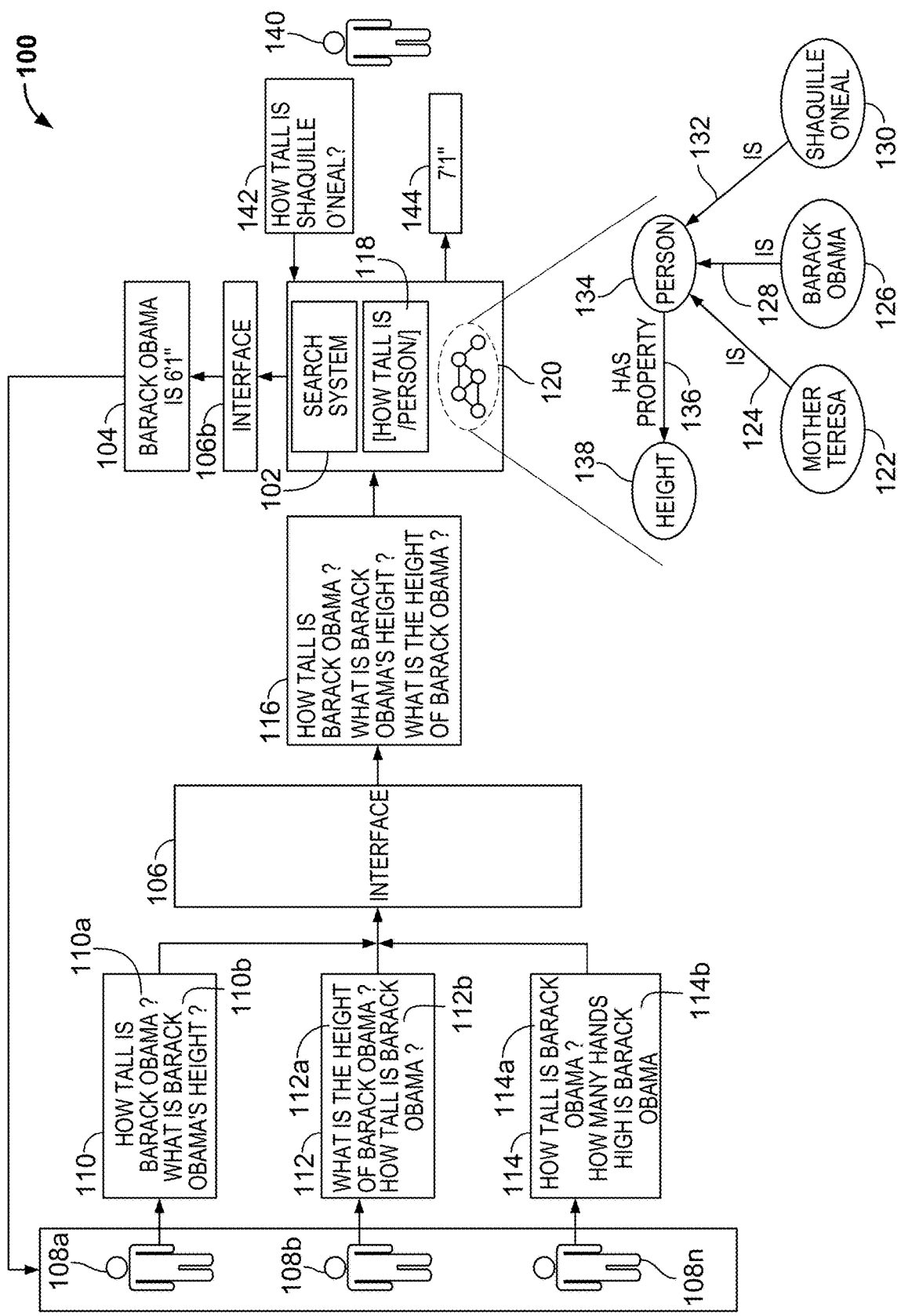
FIG. 1 is a conceptual diagram illustrating an example system that can perform implementations of the present disclosure.

FIG. 1 is a conceptual block diagram illustrating an example system 100 that can perform implementations of the present disclosure. In general, the system 100 includes structural components arranged and connected to receive one or more queries that include terms directed to particular attributes and particular topics, normalize the queries into query patterns that include those particular attributes and particular topics, generalize the one or more obtained query patterns into generalized query patterns, and associate the generalized queries patterns with one or more other topics that include the particular attribute or one or more other attributes of the particular topic. Then, when a user submits a query to a search system, the search system may provide the user with an answer to that query based on the generalized query patterns associated with one or more topics or one or more attributes in a data store accessible to the search system.

The example system 100 includes a search system 102 that can be used to receive one or more queries and to provide information corresponding queries received from one or more users. For example, the search system 102 can be configured to answer queries such as "How tall is Barack Obama?" "Who was president in 1943?" "How big is the White House?" and many other queries. The search system 102 can provide a graphical user interface to a user by which the user can submit a particular query.

In some implementations, to obtain the training data used by the search system 102 to answer the submitted queries, the system 100 can provide a statement that includes the particular attribute and the particular topic, such as the statement "Barack Obama is 6'1"" as shown as box 104. The provided statements can be used to generate one or more queries, such as queries 116. The terms of the queries can be used to generate one or more normalized query patterns. The normalized query patterns can then be generalized by the system 100 and associated with one or more attributes of one or more topics.

The associations can also be stored in a data store, such as data store 120, that can be accessed by the search system 102. As such, when another user, such as user 136, submits a query to the search system 102 in an attempt to find an answer about a particular attribute of a particular topic, the search system 102 can quickly and efficiently find the value for the particular attribute of the particular topic that is stored in the data store 120.

In general, both the provided statements and the received queries can be managed by an interface 106. The interface 106 can be any of a variety of appropriate interfaces through which the system 100 can communicate with a network and other computing devices connected to the network. For example, the interface 102 can be a combination of software, firmware, and hardware (e.g., one or more layers in the ISO 7-layer network stack) including, but not limited to, an application that can be used by a user to submit one or query patterns to the system 100. Examples of computing devices include, but are not limited to, desktop computers, laptop computers, tablet computers, smartphones, and other mobile devices.

In some implementations, as it relates to statement 104, the interface 106 can provide the statement 104 to an automated system. In response, the automated system can generate one or more query patterns based on the received statement 104. For example, the automated system can examine a record of received query terms to identify one or more query patterns that match at least part of the statement 104. In other implementations, the interface 106 can provide the statement 104 to one or more human users 108a-108n. In response, the human users 108a-108n may each submit one or more queries and may rate each query generated by other human users 108a-108n. For example, the human users may generate queries 110, 112, and 114, respectively in response to receiving the statement 104.

In some implementations, the interface 106 can filter the received queries to generate filtered queries 116. For example, in reference to FIG. 1, the filtered queries 116 include particular queries 110a, 110b, 112a, 112b, and 114a. The filtered queries 116 do not include the query 114b. In the depicted example, one reason why the query 114b has been removed is because one or more of the human users 108a-108n determined the query to not be well-suited to elicit information about the particular topic, although other reasons are also possible. That is, the query "how many hands high is Barack Obama?" may be useful for obtaining information about a horse, but is generally not well suited to a person. The interface 106 can filter the queries using a variety of techniques.

In some implementations, the interface 106 can determine whether a frequency of occurrence for a particular query pattern satisfies a predetermined threshold. If the frequency of occurrence for a particular query pattern does not satisfy the predetermined threshold, the query pattern can be removed from the filtered query patterns 116. For example, the query pattern 114b has a frequency of occurrence of one, which in the particular example of FIG. 1 does not satisfy the predetermined threshold. An occurrence of one, however, may satisfy the predetermined threshold in other implementations. Therefore, the interface 106 removes query pattern 114b from the filtered query patterns 116.

In some implementations, in addition to, or in combination with the threshold-based filtering, the interface 106 can use one or more ratings provided by the human users 108a-108n to filter the received queries. For example, in reference to FIG. 1, the query 114b may have been filtered by the interface 106 because the queries 114b received low ratings from human users 108a and 108b.

The filtered queries 116 can be converted into normalized query patterns by the system 100. These normalized query patterns can also be generalized by the system 100. In some implementations, the system generalizes the normalized query patterns by selecting one or more portions of the normalized query patterns, removing those selected portions from the normalized query patterns, and replacing the removed portions with one or more identifiers. For example, the query pattern [how tall is Barack Obama,] can be generalized to [how tall is/Person/,] shown as generalized query pattern 118. As another example, query pattern [what is Barack Obama's height,] can be generalized into a first generalized query pattern [what is/Person/'s height] and a second even more generalized query pattern [what is/Person/'s/Attribute/.] Here, the second generalized query pattern includes generalized identifiers for both the topic and the attribute. Although other generalized patterns are also possible for any combination of attribute and topic.

Once the query patterns have been generalized, the system 100 can associated the generalized query patterns with appropriate aspects of a data store (e.g., data store 120). For example, the generalized query pattern [how tall is/Person/] can be associated with a height attribute of a person attribute stored in the data store 120. As will be described in more detail below, this associated allows for the search system 102 to obtain values pertaining to submitted queries by the query into a query pattern and matching the query pattern to one of the generalized query patterns stored in the data store 120, even in situations when the submitted query may not have been previously processed by the system 100.

In some implementations, the identifiers used when generating the generalized query patterns can be determined by the information stored in the data store 120. For example, because the data store 120 includes information that specifies "Barack Obama" as a person, the system can replace "Barack Obama" in a normalized query pattern with a "/Person/" identifier or other similar identifier.

Referring again to the search system 102, the search system 102 may also include, or be communicatively coupled to, the data store 120. The data store 120 can include a plurality of topics each of which may include one or more attributes. For example, a portion of data store 120 is shown in an exploded view. The data store 120 can include the topics 122, 126, and 130. Each of these topics can include one or more attributes, and as shown in the example exploded view, one or more of these attributes, such as attributes 134 and 138, can be shared for multiple topics.

In addition, these attributes may be related to different aspects of the data store 120 using different relationships 124, 128, 132, and 136. For example, the "Barack Obama" topic 126 includes a "Person" attribute 134 that is connected by an "is" relationship 128. Or stated another way, Barack Obama is a person. Similarly, the "Person" attribute 134 is connected to the "Height" attribute 138 by an "Has Property" relationship. That is, a person has a height. As such, the attributes and topics are connected to form a data graph that can be traversed by the system 100. For example, the search system 102 can determine, by traversing the data graph, that topic 130 ("Shaquille O'Neal") is a person. That is, the system can use relationship 132 that connects the topic 130 to attribute 134. The search system 102 can also identify a particular value for the topic's height. For example, the search system 102 can use the relationship 136 that connects attribute 134 with attribute 138 to retrieve a value stored with attribute 138 for topic 130.

By way of example, consider a situation where a user 140 submits a query 142, such as the question "How tall is Shaquille O'Neal?" to the search system 102. By traversing the data graph stored in the data store 120, the search system 102 can return a value for Shaquille O'Neal's height so long as a value for his height is stored in the data store 120, and by extension is available to the search system 102. This may be true even if the search system 102 has never before processed the question 142. For example, if a generalized query pattern [how tall is/Person/] has been previously associated with the height attribute 138 of the data store 120, the search system 102 can obtain the height value for any topic that is a person stored in the data store 120.

In some implementations, the query 142 can be converted into a normalized query pattern, here such a normalized query pattern may be [how tall is shaquille o'neal]. The normalized query pattern may be compared to the generalized query pattern [how tall is/Person/] that is associated with the height attribute 138. When the search system 102 determines a similarity between the query 142 and the generalized query pattern that is associated with the height attribute 138, e.g., based on a comparison of a generalized query pattern with a normalized query pattern formed from the terms in the query, the search system 102 can traverse the data graph starting at the topic identified in the query and then traversing the nodes until the system obtains the value of the topic's height. For example, because the query 142 includes the topic 130 of the data store 120, the search system 102 can traverse the data graph until the search system 102 reaches the height attribute 138 which contains a value for the topic's height. Here, that value is 7'1".

Once the search system obtains the value for the query 142, the search system 102 can provide an answer 144 to the user 140. In some implementations, the answer is included in a portion of a user interface presented to the user 140. In some implementations, additional attributes that describe the topic can also be presented to the user in the different portions of the same user interface. A user interface for presenting information to a user is described in more detail below.

In some implementations, the statement 104 is selected to cause one or more queries to be received by the interface 106 that include the particular attribute for which associations for the one or more generalized query patterns that include the particular attribute are needed, and the interface is further configured to receive the queries in response to providing the statement. For example, consider a situation where the data store 120 does not include a generalized query pattern for the height attribute 138. The system 100 can identify such a situation and generate a statement about one of the topics, such as the topics 122, 126, or 130.

Then, the system 100 can process the received queries as described above to associate the height attribute 138 with one or more generalized query patterns. In the depicted example, one statement, such as statement 104, can be used to generate generalized query patterns that can be used to retrieve information about an attribute of three different topics. Larger data sets, however, can leverage this technique to efficiently learn generalized query patterns for a substantially large amount of attributes and topics stored in a data set using much smaller number of statements. This is particularly so where a data set can include hundreds of millions of topics or more, each of those topics can include thousands of attributes or more.

In some implementations, some combination of statement, queries, query pattern, and generalized query pattern may include a modifier. For example, in the queries "Who was president of the United States in 1943?" the year 1943 serves to restrict the attribute "president" of the topic "the United States" to the year 1943. Techniques described above can also be used to generalize these types of query patterns. For example, a generalized query pattern [Who was/President/of the United States in/Modifier/] can be constructed. As another example, an even more generalized query pattern [Who was/Political Position/of the/Country/in/Modified] can be constructed according to particular implementations. This generalized query pattern can be used by the system 100 to answer queries about political positions attributes of any country topic stored by the system 100, where the system 100 can limit such an answer to the modifier supplied in the question that is matched.

Figure 2:
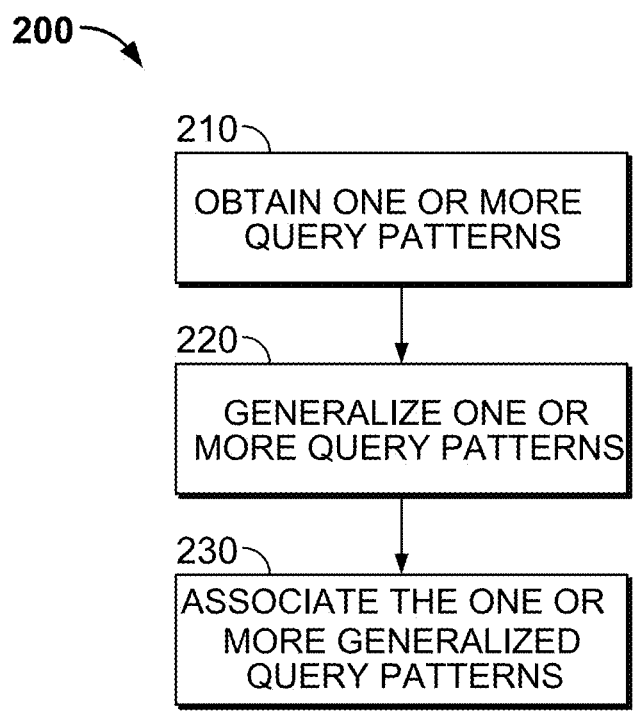
FIG. 2 is a flow chart of an example technique that can be performed to implement aspects of the present disclosure.

FIG. 2 is flow chart of an example technique 200 that can be performed to implement aspects of the present disclosure. In general, the technique 200 involves storing generalized query patterns directed to one or more attributes or one or more topics that can be used to later retrieve other information about particular attributes of particular topics. The technique 200 is described in reference to system 100, although other systems may be configured to perform technique 200. In one example, the technique 200 can be performed in response to providing a statement 104 to an automated system. In another example, the technique 200 can be performed in response to providing the statement 104 to one or more human users.

In step 210, the system 100 can obtain one or more query patterns. For example, the system 100 can receive one or more queries 110-114 through interface 106. The system 100 can then generate one or more normalized query patterns from the received queries. For example, the one or more collections of query terms can be normalized using a variety of techniques including removing blacklisted words, removing stop-words, removing punctuation, converting capitalization into a consistent form, such as all lower case, or other techniques.

In some implementations, the query patterns can be obtained in response to the system 100 providing a statement. For example, the system 100 can provide human users 108a-108n with a statement 104 using interface 106. In response, the human users 108a-108n can generate their respective query patterns 110-114 and send the query patterns to the system using interface 106.

In step 220, the system 100 can generalize one or more of the query patterns. For example, the system 100 can identify one or more portions of the query patterns that match an attribute or a topic stored by the system 100 in a data store, such as data store 120. The system 100 can remove the matched portions of the query pattern and replace the matched portions of the query pattern with one or more identifiers. As a result, for example, the system 100 can generate the generalized query pattern 118 from query patterns 110-114.

In some implementations, step 220 can be an iterative technique first generalizing the query pattern according to the portions of the query pattern corresponding to attributes of a topic and then generalizing the query pattern according to the portions of the query pattern corresponding to the topic. In some implementations, step 220 can be iterative by incrementally generalizing the category of the topic or attribute.

For example, the Barack Obama topic or Abraham Lincoln topic may be associated with a number of different categories such as presidents, politicians, Americans, men, and people, with the categories going from least general to most general. The system 100 may first generalize the query pattern according to the presidents category, such as [what is/President's/ /Height/] and progressive generate more generalized query patterns until the system 100 generates [what is/Person/'s/Height/].

In some implementations, the queries can be filtered before being generalized. For example, queries 110-114 can be filtered using one or more filtering techniques to generate filtered queries 116 before the system 100 generates normalizes query patterns or generalizes the query patterns.

In step 230, the system 100 can associate the one or more generalized query patterns. For example, the generalized query patterns can be associated and stored in suitable places of the data store 120 based on the association captured by the generalized query pattern. For example, using one or more iterative approaches, for a person, many of the query patterns can be generalized to [what is/Person/'s/Attribute/].

As such, the [what is/Person/'s/Attribute/] generalized query pattern can be associated with each attribute of a topic that is a person. For example, a determination about whether a topic is a person can be specified by one or more relationships of the data store 120, such as relationships 124, 128, and 132 in the data store 120. These relationships specify that topics 122, 126, and 130 are people and suggest that the generalized query pattern can be associated with each attribute, including attribute 138 that has a relationship to the attribute 134.

In some implementations, the associations generated by technique 200 can be used to answer queries submitted to the search system 102 by one or more users. For example, the search system 102 can receive a query 142 from user 140. The system 100 can then convent the query into a normalized query pattern, such as [how tall is shaquille o'neal]. The system 100 can then determine that the query 142 includes a first portion that matches a particular, generalized query pattern, such as generalized query pattern 118. Here, the portion "how tall is" in the query 142 [how tall is shaquille o'neal] matches the generalized query pattern 118 [how tall is/Person/]. The system 100 can then retrieve the value '7'11"' from the data store and submit that value as an answer 144 to the query 142 provided by the user 140.

In some implementations, based on determining that the normalized query pattern includes a first portion that matches the particular, generalized query pattern, the system 100 can retrieve a value of the particular attribute of another topic referenced by the query pattern, as will described in more detail below. In addition, in some implementations, other values corresponding to attributes of the Shaquille O'Neal topic can be presented to user 140. For example, teammates of Shaquille O'Neal, the teams he has played for, the number of championships he has won, and various other basketball related attributes can be presented to the user.

In some implementations, when the system 100 traverses the relationships in the data store 120, the system 100 can retrieve additional data values that are related or otherwise relevant to a combination of the topic identified by the query and the terms provided in query. For example, a query "how many points did Shaquille O'Neal score in his career?" may cause the system 100 to provide other basketball related statistics. As another example, a query "how tall is Shaquille O'Neal?" may cause the system 100 to provide other heights for some of his other teammates. This additional data can be presented along with the attribute or identified in the received collection of query terms. Other examples of presenting attributes are also possible.

In some implementations, the technique 200 can be used to process questions received as voice input. For example, a user can speak the query "How tall is Shaquille O'Neal?," instead of typing or otherwise providing a text version of the query. The voice input can then be converted into text using a speech recognition system or other conversion techniques. The converted text can be matched with generalized query patterns as described above. Then, the answer to the query, here '7'1",' can converted into some textual form and converted into speech using a speech synthesizer or other technique.

Figure 3:
FIG. 3 is an example user interface that can be used to present information obtained using implementations of the present disclosure.

FIG. 3 is an example user interface 300 that can be used to present information obtained using implementations of the present disclosure. In general, the user interface 300 can be displayed on an appropriate computing device and allows the user to communicate with aspects of the system 100, such as search system 102. For example, referring to FIG. 1, the user interface 300 can be used by the user 140 to submit query 142, to the search system 102 and to receive answer 144 from the search system 102.

The user interface 300 can be presented as part of an application executing on a particular computer device. For example, the user interface 300 can be presented by a web browser application or other application that can communicate with aspects of the system 100, such as search system 102. The user interface 300 can include one or more different user interface regions, such as regions 302, 304, 306, and 308. Some of the user interface regions can receive user input and other regions can present information without being configured to receive use input, as will be described in more detail below.

The user interface region 302 can be configured to receive one or more characters entered by a user, or other user input such as mouse clicks or stylus presses. For example, a user can type the query "how tall is barack" in the input field 302*a* and then select, with a mouse or stylus, the magnifying glass icon 302*b* to submit the query to the search system 102. In response, the search system 102 can perform any of the techniques described in this document to obtain a value for the query and present the value in one of the user interface regions of the application 300.

The user interface region 304 can be configured to present a value obtained by the search system 102 to the user. For example, here the user interface region 304 presents the value "6'1"," which corresponds to a value for the query submitted using user interface region 302. In some implementations, the user interface region 304 can be configured to be a presentation area only. That is, in some implementations, the user interface region 304 does not perform any additional operations when receiving user input.

In some implementations, the user interface region 304 can also present attributes for other topics, as determined by the search system 102. For example, the user interface region 304 may optionally present the height of Michelle Obama as 5'11." For instance, the search system 102 can examine a record of received query terms to associate the two topics has having some association. In some implementations, the two topics may be provided in the same query, such as "who are Barack and Michelle Obama?" In other implementations, the two topics may be provided in separate queries, by a same user, but done so in a close proximity of time. For example, a user can first provide a query "who is Barack Obama?," and then thereafter providing another query "who is Michelle Obama?"

As another example, the user interface region 304 may present contrary or contrasting information based on various information, including information from examining a record of received query terms and examining a record of user selections. For example, if a query about height is directed to the topic "Robert Wadlow," one of the tallest humans on record, the user interface region may also present a value for the height of one of the shortest humans on record, as determined by the search system 102. For instance, the search system 102 can examine a record of received query terms and a record of user selections to associate the topic "Robert Wadlow" with the topic "Chandra Bahadur Dangi," For example, users that provide a query to search for the topic "Robert Wadlow," may also select search results that correspond to topic "Chandra Bahadur Dangi." Then, when a user submits a query directed to topic "Robert Wadlow"'s height, the search system can also provide the height of topic "Chandra Bahadur Dangi" to contrast the value provided for topic "Robert Wadlow."

The user interface region 306 can present additional information about one or more topics as determined by the search system 102. In some implementations, the search system 102 can identify one or more documents and associated links that can be used to navigate to the respective documents. These links can be provided to the user interface 300 and the user interface 300 can present the one or more links. For example, the user interface region 306 presents a plurality of links associated with documents that include information about Barack Obama's height, Michelle Obama's height, Malia Obama's height, and heights of various American presidents and presidential candidates. In some implementations, the user interface region 306 can be configured to receive one or more mouse clicks, stylus presses, or other input device events that cause an application presenting the user interface 300 to navigate to the document associated with the particular link.

The user interface region 308 can present additional attributes about a particular topic, additional topics that share one or more attributes, additional topics that are related an examination of a record of received query terms, based on an examination a record of user selections, or combinations of these. For example, the user interface region 308 can present additional attributes identified by the search system 102 about the particular topic in a first portion 308*a* of the user interface region. As another example, the user interface region 308 can present additional topics that share one or more attributes or additional topics that related based on mined query logs.

In some implementations, one or more aspects of the user interface region 308 can be user-selectable items causing the application presenting the user interface 300 to navigate to the document associated with the particular user selection. For example, if a user selects on the "Honolulu" link, the application presenting the user interface 300 may navigate to a document that presents more information about Honolulu.

As another example, if a user selects one of the pictures in portion 308*b*, the application presenting the user interface 300 may navigate to a document that presents more information about the particular selection.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
accessing a set of generalized query patterns for eliciting a search engine to provide an answer that includes a value for a given attribute shared by a plurality of different topics, wherein:
each generalized query pattern included in the set of generalized query patterns corresponds to a different attribute shared by the plurality of different topics and (ii) specifies respective relationships of a corresponding attribute and one or more topics from among the different topics,
relationships specified by the set of generalized query patterns includes at least two relationship types, and
each attribute is descriptive of a characteristic of a corresponding topic;
receiving a search query that includes a relationship of a particular attribute and a particular topic;
identifying, from among the set of generalized query patterns, a particular generalized query pattern that corresponds to the relationship of the particular attribute and the particular topic;
retrieving a particular value for the particular attribute of the received search query, the particular value being specified by the particular generalized query pattern that corresponds to the particular attribute and the particular topic; and
generating an answer to the search query that includes the retrieved value for the particular value for the particular attribute of the received search query.

2. The method of claim 1, comprising:
determining that the search query includes a first portion that matches a particular, generalized query pattern; and
based on determining that the search query includes the first portion that matches the particular, generalized query pattern, retrieving a value of the particular attribute of a topic referenced by the query.

3. The method of claim 1, wherein the generalized query patterns relate to a statement and are normalized.

4. The method of claim 1, wherein the generalized query patterns each occur with a frequency that satisfies a predetermined threshold.

5. The method of claim 1, wherein each of the generalized query patterns include a respective first portion with one or more identifiers that correspond to a topic.

6. A non-transitory computer storage device encoded with a computer program, the program comprising instructions that when executed by one or more computers, cause the one or more computers to perform operations comprising:
accessing a set of generalized query patterns for eliciting a search engine to provide an answer that includes a value for a given attribute shared by a plurality of different topics, wherein:
each generalized query pattern included in the set of generalized query patterns corresponds to a different attribute shared by the plurality of different topics and (ii) specifies respective relationships of a corresponding attribute and one or more topics from among the different topics,
relationships specified by the set of generalized query patterns includes at least two relationship types, and
each attribute is descriptive of a characteristic of a corresponding topic;
receiving a search query that includes a relationship of a particular attribute and a particular topic;
identifying, from among the set of generalized query patterns, a particular generalized query pattern that corresponds to the relationship of the particular attribute and the particular topic;
retrieving a particular value for the particular attribute of the received search query, the particular value being specified by the particular generalized query pattern that corresponds to the particular attribute and the particular topic; and
generating an answer to the search query that includes the retrieved value for the particular value for the particular attribute of the received search query.

7. The non-transitory computer storage device of claim 6, the operations further comprising:
determining that the search query includes a first portion that matches a particular, generalized query pattern; and
based on determining that the search query includes the first portion that matches the particular, generalized query pattern, retrieving a value of the particular attribute of a topic referenced by the query.

8. The non-transitory computer storage device of claim 6, wherein the generalized query patterns relate to a statement and are normalized.

9. The non-transitory computer storage device of claim 6, wherein the generalized query patterns each occur with a frequency that satisfies a predetermined threshold.

10. The non-transitory computer storage device of claim 6, wherein each of the generalized query patterns include a respective first portion with one or more identifiers that correspond to a topic.

11. A system comprising:
one or more computers and one or more storage devices storing instructions that are operable, when executed by the one or more computers, to cause the one or more computers to perform operations comprising:
accessing a set of generalized query patterns for eliciting a search engine to provide an answer that includes a value for a given attribute shared by a plurality of different topics, wherein:
each generalized query pattern included in the set of generalized query patterns corresponds to a different attribute shared by the plurality of different topics and (ii) specifies respective relationships of a corresponding attribute and one or more topics from among the different topics,
relationships specified by the set of generalized query patterns includes at least two relationship types, and
each attribute is descriptive of a characteristic of a corresponding topic;
receiving a search query that includes a relationship of a particular attribute and a particular topic;
identifying, from among the set of generalized query patterns, a particular generalized query pattern that corresponds to the relationship of the particular attribute and the particular topic;
retrieving a particular value for the particular attribute of the received search query, the particular value being specified by the particular generalized query pattern that corresponds to the particular attribute and the particular topic; and
generating an answer to the search query that includes the retrieved value for the particular value for the particular attribute of the received search query.

12. The system of claim 11, the operations further comprising:

determining that the search query includes a first portion that matches a particular, generalized query pattern; and based on determining that the search query includes the first portion that matches the particular, generalized query pattern, retrieving a value of the particular attribute of a topic referenced by the query.

13. The system of claim 11, wherein the generalized query patterns relate to a statement and are normalized.

14. The system of claim 11, wherein the generalized query patterns each occur with a frequency that satisfies a predetermined threshold.

15. The system of claim 11, wherein each of the generalized query patterns include a respective first portion with one or more identifiers that correspond to a topic.

* * * * *